United States Patent [19]

Ballyns

[11] Patent Number: 5,699,041

[45] Date of Patent: Dec. 16, 1997

[54] PNEUMATIC PRESSURE SENSOR DEVICE

[76] Inventor: Jan Ballyns, 1125 Meadowlane Crescent, Pickering, Ontario, Canada, L1X 1E5

[21] Appl. No.: 601,130

[22] Filed: Feb. 14, 1996

[51] Int. Cl.$^6$ ............................ B60C 23/00; B60C 23/02

[52] U.S. Cl. ............... 340/442; 200/834; 200/61.25; 73/146.5; 73/146.8; 340/445; 340/447

[58] Field of Search ...................... 340/442, 445, 340/447, 626, 665; 73/146, 146.2, 146.4, 146.5, 146.8; 200/83 D, 83 N, 83 R, 83 Y, 61.22, 61.25, 83 A; 116/34 R, 34 B

[56] References Cited

U.S. PATENT DOCUMENTS

| | | | |
|---|---|---|---|
| 3,787,806 | 1/1974 | Church | 200/61.22 |
| 4,701,742 | 10/1987 | Ruehr | 200/61.25 |
| 4,954,677 | 9/1990 | Alberter et al. | 200/61.25 |
| 5,573,610 | 11/1996 | Koch et al. | 340/447 |
| 5,573,611 | 11/1996 | Koch et al. | 340/447 |
| 5,635,691 | 6/1997 | Ballyns | 73/146.5 |

*Primary Examiner*—Jeffery A. Hofsass
*Assistant Examiner*—Timothy Edwards, Jr.
*Attorney, Agent, or Firm*—Young & Thompson

[57] ABSTRACT

A pneumatic pressure sensor switch device for giving a warning signal if a pneumatic vehicle tire has too low pressure has a gas-filled chamber, separated from the inflation space in the tire by a first flexible diaphragm, and having another, second flexible diaphragm as its opposite wall, which has electrical contact means cooperating with a stationary contact point in the sensor. If the tire pressure is not too low, the first diaphragm is moved by the tire pressure to compress the gas in the said gas-filled chamber, which gas moves the second diaphragm out of contact with the stationary contact point. If the tire pressure drops below a certain value, the second diaphragm closes an electric circuit with battery and transmitter, so that a signal is given to the outside. There may be a third diaphragm bordering another closed chamber and by an electric series-connection to said second diaphragm, avoiding that a signal is given at atmospheric outside pressure, so as not to lose energy during storage or absence of a tire on the wheel. There may be two or more such sensors giving a signal at different pressures and they may be embodied so as to give signals in the correct pressure range in tires having two different inflation pressures in view of different loads of the vehicle or adaptation to switching tires from front to back of the vehicle.

11 Claims, 2 Drawing Sheets

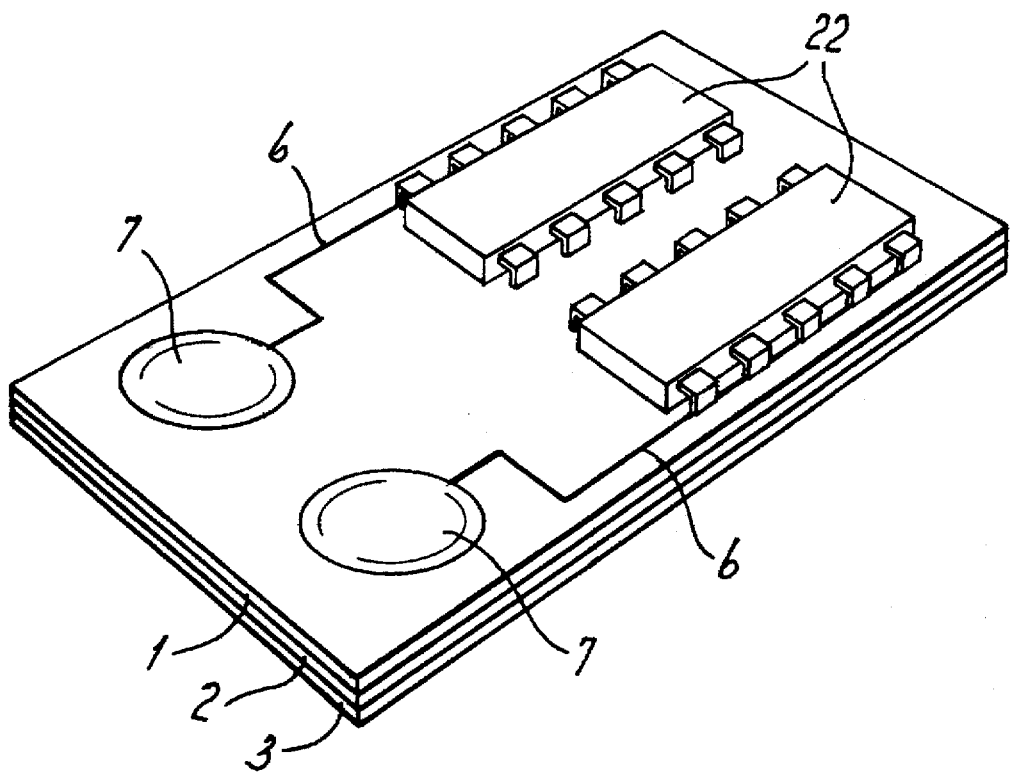

5,699,041

PNEUMATIC PRESSURE SENSOR DEVICE

FIELD OF THE INVENTION

This invention relates to a pneumatic pressure sensor switch device for a pneumatic tire, with means for mounting it in the inflation chamber of the tire.

PRIOR ART

Such devices are known in different embodiments, in which the pressure in the inflation chamber in the tire is compared with a reference pressure by having these pressures act on both sides of a flexible diaphragm separating both pressures. If the pressure in the tire becomes hazardously low, the reference pressure makes the diaphragm flex as to close electrical contact means to give a signal to the outside. To this end there is a battery and a radio transmitter taken up in an electric circuit with these contact means. Such signals may be received by a receiver outside the tire, e.g. in the driver's cabin of the vehicle, and there be transformed into an audible and/or visible warning signal.

The reference pressure may be the pressure exerted on the diaphragm by a mechanical spring or by a gas. In the first case (U.S. Pat. No. 4,048,614 to Shumway) the sensor reacts when the pressure in the tire drops below a predetermined absolute pressure. This is not very accurate in view of mechanical tolerances and because the spring has to be taken up in a chamber, which cannot be hermetically sealed and in which the air pressure varies with the air pressure in the tire. The entire structure is complicated and vulnerable. Means to vary the tension of the spring allow different settings of the pressure, at which an alarm is given.

In the second case, applying a gas to exert the reference pressure (U.S. Pat. No. 4,890,090 to the applicant) a diaphragm is used, which is slightly pervious to air. Thereby the gas pressures in the tire and in a chamber for the reference pressure, in contact with the diaphragm, tend to equalize gradually. As soon as the pressure in the tire drops hazardously, the pressure in the reference chamber cannot follow this pressure drop immediately, so that the diaphragm is flexed to close the electrical contact means, by which a signal is given to warn about a hazardous situation.

This has the advantage that no signal is given during considerable pressure differences in the tire, which are only due to normal deviations in operation, such as differences in inflation pressure and pressure differences owing to varying temperatures, e.g. between cold storage of the vehicle during the night and heavy traffic under high load, sunshine, etc. during hours of operation. Vehicles stored for extended periods, in which tire pressure drops due to permeability of tire casing, will not set off the alarm.

OBJECT OF INVENTION

In many cases there is, however, still the need to have sensors of such type react as accurately as possible to absolute pressures in the tire, which are deemed too low, and it is the main object of this invention to provide such sensors with a simple design and reliable operation, as little as possible sensitive to mechanical tolerances and temperature differences.

SUMMARY OF INVENTION

To this end the invention proposes to provide the sensor with two closed chambers filled with gas, a first one of the chambers being bordered by two flexible diaphragms in opposite walls thereof, a first one of the diaphragms separating the chamber from and being exposed to the pressure in the inflation chamber of the tire, the other, second, one of the diaphragms separating the closed chambers mutually and carrying an electrical contact point moving therewith and cooperating with a stationary contact point in the sensor. The contact points being taken up in an electric circuit including a source of electric energy and a transmitter to give radio signals to the outside when the circuit is closed, the the first closed chamber between the two diaphragms being filled by gas under pressure above atmospheric pressure, so that movements of said first diaphragm are adapted to vary the pressure of the gas in the the first chamber by which pressure variation the second diaphragm is moved, the the electrical contacts being open at higher outside pressures on the first diaphragm and closed by the second diaphragm at lower outside pressures on the first diaphragm.

As the the first diaphragm moves the second one by compressing the gas between them, no mechanical means such as a spring moved mechanically by the first diaphragm are necessary, while the electrical contact means can be mounted entirely inside the sensor, fully protected against moisture and dirt. Moreover, there is the least possible influence of changes of temperature in the tire on the correct result as the closed chamber between the diaphragms will rapidly take up the temperature inside the tire so that its gas pressure changes in the same direction and about to the same amount as the air pressure in the tire. This means that a warning signal can be given if the tire pressure has a predetermined pressure difference below the desired and safe pressure even if this pressure changes with temperature.

Preferably the contact points are positioned between these diaphragms, i.e. inside the first closed chamber.

To avoid the sensor using electrical energy when in storage or during transport separately or in a non-inflated tire or on a wheel without a tire, the invention proposes to provide the sensor with a third closed chamber, which has a third flexible diaphragm separating it from the inflation space in the tire, said third closed chamber being filled with gas at a pressure below the pressure in the first closed chamber, electrical contact means carried by the diaphragm and by a stationary part of the sensor being taken up in series connection in said electric circuit and being closed when said diaphragm is pressed into the third chamber by pressures in the inflation space in the tire above atmospheric pressure.

The gas pressure in said third chamber is preferably only slightly above atmospheric pressure. This means that atmospheric pressure on the outside of the sensor and so on the third diaphragm will be counteracted by this pressure so that the electric circuit will be kept open until the pressure on said third diaphragm rises to a certain value above atmospheric.

There may be more than one sensor in the same tire, preferably mounted on the same carrying member, carrying them together with a battery, a transmitter and related electric leads, etc. Such sensors may operate at different pressures, at which a warning signal is given and this will be described in more detail below.

The gas to fill the closed chambers is preferably nitrogen. It protects the interior of the sensor adequately against corrosion, etc. Moreover, the thermal expansion coefficient of nitrogen is closed to that of air.

BRIEF DESCRIPTION OF THE DRAWINGS

The invention will now be explained in some detail by reference to the attached drawings, in which:

FIG. 3 is a somewhat diagrammatic view of a printed-circuit board with two such sensors.

DETAILED DESCRIPTION OF THE PREFERRED EMBODIMENTS

Figure 1:
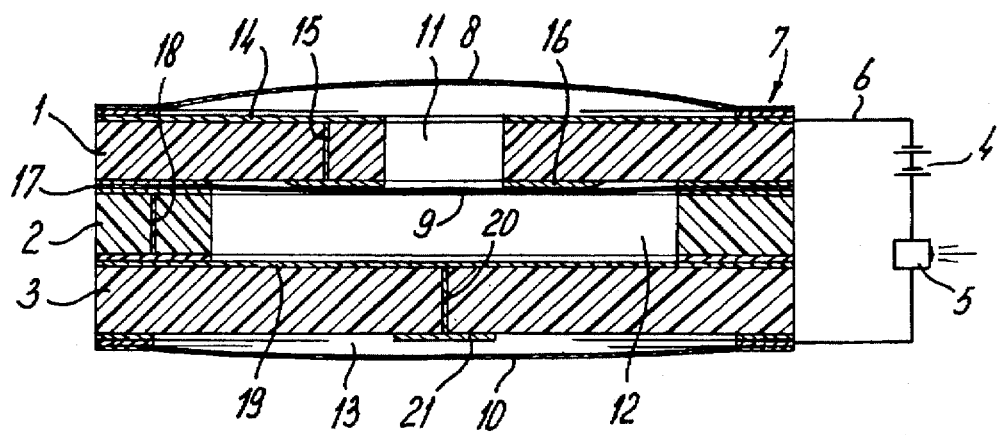
FIG. 1 is a section through a sensor according to this invention in a preferred embodiment.

In FIG. 1 the sensor is built into a multiple-layer printed-circuit-board with layers 1, 2 and 3. These boards are only shown in the zone of the sensor, but may extend considerably to one or more or all sides with respect to the drawing, so as to taken up further electrical parts, leads, etc. and to provide mounting means for the sensor on a vehicle wheel, such as by being provided with a belt slung around the wheel and buckled thereto, or by being taken up in a casing glued, welded or soldered to the wheel, or in any other suitable way. So, this board carries a battery 4, a transmitter 5 and electric leads 6 and other electric parts deemed necessary or preferable.

The sensor itself, indicated by 7, has three thin gastight flexible diaphragms 8, 9 and 10, preferably of metal. So, they are electrically conductive. They may be made from another material, conductive or not, and in the latter case there should be separate means, metal strips or coatings to give the required electrical conductivity. Between diaphragms 8 and 9 there is a gastight first chamber 11, filled with nitrogen at a pressure somewhat near the normal inflation pressure (operating pressure) in the tire. Below diaphragm 9 and bordered at its bottom by pc-board-layer 3 is a second gastight chamber 12 filled with nitrogen at a pressure about the same as the normal inflation pressure in the tire, Vide below for details of these pressures.

Below pc-board-layer 3 there is the third diaphragm 10 confining with this layer 3 a third gastight chamber 13 at a pressure slightly above atmospheric pressure.

The diaphragms 8, 9 and 10 are so thin, that their inherent elasticity does not play an important role in their functioning.

The electric leads 6 are electrically connected to diaphragm 8 and conducting layer 14, and by one or more local connections 15 through pc-layer 1 to annular contact zone 16. Diaphragm 9 makes electrical contact with a metal layer 17 around it, which has one or more local connections 18 through layer 2 to a metal layer 19 on pc-board-layer 3, from which a central electrical connection 20 passes through layer 3 to terminate in a flat contact point (zone) 21 on the bottom of layer 3. Diaphragm 10 is electrically connected to the leads 6 at the opposite end of the electric circuit.

It will thus be clear that an electric current can only flow to transmitter 5 if diaphragm 9 contacts contact zone 16 and if diaphragm 10 contacts contact zone 21 simultaneously.

At atmospheric ambient pressure, the diaphragms 8, 9 and 10 are in the position shown, so that no signal is given as no current can flow because diaphragm 10 does not contact zone 21.

If the outside pressure rises, diaphragm 10 is pushed upwardly as seen in FIG. 1, until it touches contact zone 21, which will take place at a pressure, depending on the gas pressure in chamber 13, e.g. at 5 psig. The electric circuit is now closed (as diaphragm 9 contacts zone 16), so that tranmsitter 5 transmits a warning signal.

As the pressure in the tire rises, diaphragm 8 is further depressed, which raises the gas pressure in the relatively small closed chamber 11 between diaphragms 8 and 9 until diaphragm 9 bends downwardly to break contact with contact zone 16. If the normal operating pressure is e.g. 30 psig; this e.g. takes place at 27 psig pressure in the tire.

Further rising of the pressure in the tire depresses diaphragm 8 further, without influence on the electric conditions.

This means that, at such a normal tire pressure of 30 psig, no electric current flows and no signal is given at this end at higher pressures.

As soon as the tire pressure drops to 27 psig or less, a signal is given to warn that the tire pressure is too low.

It is possible to provide the sensor device with more than one of such sensors 7 with, in the chambers 11 and 12, mutually different gas pressures so that one sensor will give a warning signal at a higher pressure than the other one. The sensors may have separate leads 6 to the transmitter or to separate transmitters, which may thus emanate different signals, e.g. of different frequency, for each sensor. The receiver may thus give a signal showing which sensor activated the transmitter, so in which pressure range the tire is. There may e.g. be three sensors giving signals one at e.g. 27 psig tire pressure or lower, one at 24 and one at 20 psig.

In FIG. 3 such a possibility is shown diagrammatically with two sensors 7 and leads 6 to different integrated circuit means 22 on the pc-board 1, 2, 3, but the electric means may be combined in generally known manner, e.g. to activate the same transmitter, but so as to give different signals depending on which sensor 7 is activated.

At the highest pressure the warning signal may e.g. be transformed in the receiver to a visual signal only, whereas at a lower pressure the second and possibly third warning signals are audible.

Figure 2:
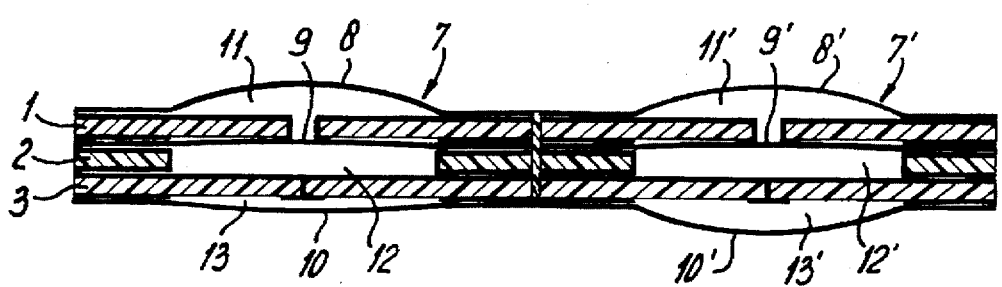
FIG. 2 is a section through a combination of two sensors operating in more than one pressure region.

Another possibility is adapted to the fact that the same tires may operate at different inflation pressures. So, the tire may be inflated to a higher pressure if more load has to be taken up, also e.g. when wheels and tires are switched from front to rear of the vehicle. It may then be that the same tire at some moment has a normal operating pressure of 40 psig, whereas at another time this inflation pressure is and should be 30 psig. It should then be avoided that in the 40 psig-mode the sensor gives a constant warning signal because the pressure is 30 psig, so well below the 40 psig. This is according to the invention obtained by applying two such sensors in the way as shown in FIG. 2. This device allows a warning signal to be given in a pressure range below the highest desired operating pressure but above the lower operating pressure. E.g. a warning signal may be given at tire pressures between 33 and 37 psig and between 27 and 5 psig only.

The two sensors 7 and 7' are mounted in the same laminated pc-board 1, 2, 3. The lefthand sensor 7 is entirely the same as the one of FIG. 1 apart from electrically conductive coatings instead of the local connections 15 and 18. This means, assuming the gas pressures in the closed chambers 11, 12 and 13 to be the same as described above for FIG. 1, that through sensor 7 no current is allowed to pass at atmospheric outside pressures and at outside pressures above 27 psig, but electric current passes and can generate a warning signal in the transmitter at pressures in the tire of 27 psig and lower, down to 5 psig.

The sensor 7' may have a common connection to the battery, etc. with sensor 7, as its diaphragm 10' is electrically connected to diaphragm 10 of sensor 7. All the other diaphragms and conductive parts of both sensors are separated. The gas pressure in chamber 11' may e.g. be about 40 psig, chamber 12' may be at a pressure of about the same height and chamber 13' may be at say 33 psig in the condition shown and at atmospheric pressure on the outside. If the tire pressure is 40 psig or higher, diaphragm 8' will keep diaphragm 9' out of contact with its stationary contact zone on pc-board-layer 1. At pressures of say 37 psig and lower, diaphragm 8' will bulge out and will cause diaphragm 9' to take up the position shown so as to make contact. Diaphragm 10' will be pressed against its stationary contact zone at higher pressures until the outside pressure drops to e.g. 33 psig and lower, at which pressure the gas in chamber 13' pushes diaphragm 10' down out of contact with its stationary contact zone.

This means that a signal is given at tire pressures between 33 and 37 psig and at pressures between 5 and 27 psig. No signal is given between 27 and 33 psig pressure in the tire. For the higher operating pressures the lefthand sensor 7 will not give a signal until the tire pressure will have dropped far too much, when the other sensor 7' will already have given the alarm. So, there is no undue loss of electric energy and there is a selective warning depending on operating pressure.

Sensor 7 may be connected at its top at 8 to another transmitter or other means in the same transmitter than sensor 7' by its top conductive part 8', to distinguish between the two alarms at the receiver side.

In all cases, the gas in the sensor chambers 11, 12, 11' and 12' and 13' easily takes up the same temperature as the air in the tire by the good conductivity of the metal diaphragms. This means that the pressures therein will rise and fall due to temperature differences to about the same amount as the pressure in the tire. This good temperature compensation has the advantage, that a signal is given if the tire pressure is a certain amount below what is the normal operating pressure in the tire, notwithstanding the fact that this operating pressure may vary rather considerably.

For chamber 13 the pressure is too low and thus too different from the normal pressure in the tire to give considerable temperature compensation in this sense, but this is not necessary for this chamber and the pressure at which diaphragm 10 contacts zone 21 may well remain about at the same low value such as at 5 psig.

As to the gas pressures in the sensor, there may be a gas filling passage through part of the layers 1, 2, 3 into the closed chambers. In manufacturing the sensors, the pressure at which it has to give a signal is exerted on diaphragms 8 (and 8') and 10 (and 10') in a suitable apparatus taking up the sensor. Chamber 11 is not filled to the somewhat higher normal operating pressure of the tire. Chamber 11 is now sealed and chamber 12 is filled with gas under pressure until diaphragm 9 makes contact with zone 16, after which the gas pressure to chamber 12 is sealed. It is thus certain that the "trip-point", the outside pressure, at which a signal is given, is at the desired value.

Chamber 13 does not give a problem as it is filled with gas at a pressure only slightly above atmospheric and not very critical.

Sensor 7' of FIG. 2 is made in the same way, but with the higher pressure. e.g. of 40 psig, in chamber 11' and a pressure of e.g. 33 psig in chamber 13'. The filling of chamber 12' also takes place up to a pressure, at which a signal is given. In this case, the pressure of filling of chamber 13' is more critical than for chamber 13.

The movements of the diaphragms as described can in fact be limited to even parts of a millimeter. This makes it easy not to rely on inherent elasticity of the diaphragms, which can be very thin and very flexible, so that the trip points are only negligibly affected by the diaphragms and are overridingly determined by gas pressures in the closed chambers.

What is claimed is:

1. A pneumatic pressure sensor switch device for a pneumatic tire, comprising: means for mounting said device entirely in an inflation chamber of the tire, a sensor having two closed chambers filled with gas, a first chamber of said chambers being bordered by two flexible diaphragms in opposite walls thereof, a first diaphragm of said diaphragms separating said first chamber from and being exposed to the pressure in the inflation chamber of the tire, a second diaphragm of said diaphragms separating said closed chambers mutually and carrying an electrical contact point moving therewith and cooperating with a stationary contact point in the sensor, an electric circuit including said contact points, a transmitter to give radio signals to the outside when said circuit is closed, said first closed chamber between said two diaphragms being filled by gas under pressure above atmospheric pressure, so that movements of said first diaphragm are adapted to vary the pressure of the gas in said first chamber by which pressure variation the second diaphragm is moved, a second closed chamber being filled with a gas under pressure above atmospheric pressure said electrical contacts being open at higher outside pressures on said first diaphragm and closed by said second diaphragm at lower outside pressures on said first diaphragm.

2. A device according to claim 1, wherein the gas pressure in the said first closed chamber is above atmospheric pressure and lower than the pressure in the said second closed chamber at atmospheric pressure in the inflation space of the tire.

3. A device according to claim 1, wherein there are two or more such sensors, said sensors having different gas pressures in their said first closed chambers to give a signal at mutually different pressures in the inflation space of the tire.

4. A device according to claim 1, wherein the sensor is mounted on a printed circuit board also carrying the other parts of the electric circuit in the tire.

5. A device according to claim 1, wherein the gas-filled chambers are filled with nitrogen.

6. A device according to claim 1, wherein said electric contact points are positioned in the said first closed chamber.

7. A device according to claim 6, wherein the stationary one of said contact points is positioned on a wall separating the said two diaphragms while leaving an opening to form the said first closed chamber bordered by both diaphragms.

8. A device according to claim 1, wherein a third closed chamber has a third flexible diaphragm separating it from the inflation space in the tire, said third closed chamber being filled with gas at a pressure below the pressure in the first closed chamber, electrical contact means carried by the diaphragm and by a stationary part of the sensor being taken up in series connection in said electric circuit and being closed when said diaphragm is pressed into the third chamber by pressures in the inflation space in the tire above atmospheric pressure.

9. A device according to claim 8, wherein the gas pressure in said third chamber is slightly above atmospheric pressure and much below normal inflating pressures of the tire.

10. A device according to claim 8, wherein said third closed chamber has a wall opposite its flexible diaphragm, which also borders said second closed chamber and carries the stationary contact point cooperating electrically with said third flexible diaphragm.

11. A device according to claim 8, wherein there are two of such sensors having mutually different gas pressures in the said first and third closed chambers.

* * * * *